(12) United States Patent
Katagawa et al.

(10) Patent No.: US 12,243,265 B2
(45) Date of Patent: Mar. 4, 2025

(54) IMAGE PROCESSING APPARATUS THAT TRACKS OBJECT AND IMAGE PROCESSING METHOD

(71) Applicant: CANON KABUSHIKI KAISHA, Tokyo (JP)

(72) Inventors: Hiroyasu Katagawa, Kanagawa (JP); Yasushi Ohwa, Tokyo (JP); Takahiro Usami, Tokyo (JP); Hiroyuki Yaguchi, Chiba (JP); Tomotaka Uekusa, Kanagawa (JP); Yukihiro Kogai, Tokyo (JP); Toru Aida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 342 days.

(21) Appl. No.: 17/703,611

(22) Filed: Mar. 24, 2022

(65) Prior Publication Data

US 2022/0309706 A1 Sep. 29, 2022

(30) Foreign Application Priority Data

Mar. 26, 2021 (JP) ................ 2021-053344

(51) Int. Cl.
*G06T 7/73* (2017.01)
*G06V 10/42* (2022.01)
(Continued)

(52) U.S. Cl.
CPC ............... *G06T 7/74* (2017.01); *G06V 10/42* (2022.01); *G06V 10/72* (2022.01); *G06V 10/80* (2022.01); *G06T 2207/20076* (2013.01)

(58) Field of Classification Search
CPC . G06T 7/74; G06T 2207/20076; G06V 10/42; G06V 10/72; G06V 10/80; G06V 10/62; G06V 10/751; G06V 40/167
(Continued)

(56) References Cited

U.S. PATENT DOCUMENTS 6,493,465 B2* 12/2002 Mori .................. G06T 7/32
382/199
7,856,137 B2* 12/2010 Yonezawa .............. G06V 40/40
382/136
(Continued)

FOREIGN PATENT DOCUMENTS

JP 2001060269 A 3/2001
JP 2005318554 A 11/2005
(Continued)

*Primary Examiner* — Negussie Worku
(74) *Attorney, Agent, or Firm* — Canon U.S.A., Inc. IP Division

(57) ABSTRACT

An image processing apparatus includes an analysis unit for analyzing an image, an extraction unit for extracting a reference image corresponding to a specific object, and a first correlation calculation unit and a second correlation calculation unit for presuming an area having a high correlation in an input image by using the reference image. The first correlation calculation unit executes presumption based on components including a direct current (DC) component, and the second correlation calculation unit executes presumption based on an alternate current (AC) component, from which the DC component is eliminated. Based on at least any one of a detection result of the specific object, a feature amount of the specific object, and an analysis result of an imaging scene, acquired by the analysis unit, the first correlation calculation unit and the second correlation calculation unit are switched when the area is presumed.

13 Claims, 10 Drawing Sheets

(51) Int. Cl.
*G06V 10/72* (2022.01)
*G06V 10/80* (2022.01)

(58) Field of Classification Search
USPC .................................................. 382/136, 103
See application file for complete search history.

(56) References Cited

U.S. PATENT DOCUMENTS

| | | | | |
|---|---|---|---|---|
| 8,149,324 B2* | 4/2012 | Oikawa | ............... | H04N 23/672 |
| | | | | 396/114 |
| 8,761,319 B2* | 6/2014 | Shirakata | ............... | H04L 25/06 |
| | | | | 375/322 |
| 8,977,058 B2* | 3/2015 | Kawata | .................... | G06T 5/20 |
| | | | | 382/148 |
| 9,706,121 B2* | 7/2017 | Saito | ........................ | G06T 7/33 |
| 2010/0007758 A1* | 1/2010 | Abe | ....................... | G06V 10/56 |
| | | | | 348/222.1 |
| 2013/0044956 A1* | 2/2013 | Kawata | .................. | H04N 1/409 |
| | | | | 382/192 |
| 2013/0094711 A1* | 4/2013 | Ishii | ........................ | G06T 7/248 |
| | | | | 382/103 |
| 2015/0116512 A1* | 4/2015 | Saito | .................. | H04N 23/6811 |
| | | | | 348/208.1 |
| 2016/0091542 A1* | 3/2016 | Kitajima | ................ | G01R 29/18 |
| | | | | 702/60 |
| 2017/0064191 A1* | 3/2017 | Ohara | .................. | H04N 25/704 |
| 2018/0084275 A1* | 3/2018 | Yanada | ................ | H04N 19/557 |
| 2019/0301855 A1* | 10/2019 | Ikemoto | ............ | G01B 11/2513 |
| 2021/0256713 A1* | 8/2021 | Katagawa | ............ | G06V 40/165 |
| 2022/0198683 A1* | 6/2022 | Kawamura | ............... | G06T 5/50 |
| 2023/0360229 A1* | 11/2023 | Kogai | ................. | G06V 10/751 |

FOREIGN PATENT DOCUMENTS

| | | |
|---|---|---|
| JP | 2010011441 A | 1/2010 |
| JP | 2011060167 A | 3/2011 |
| JP | 2018152771 A | 9/2018 |

* cited by examiner

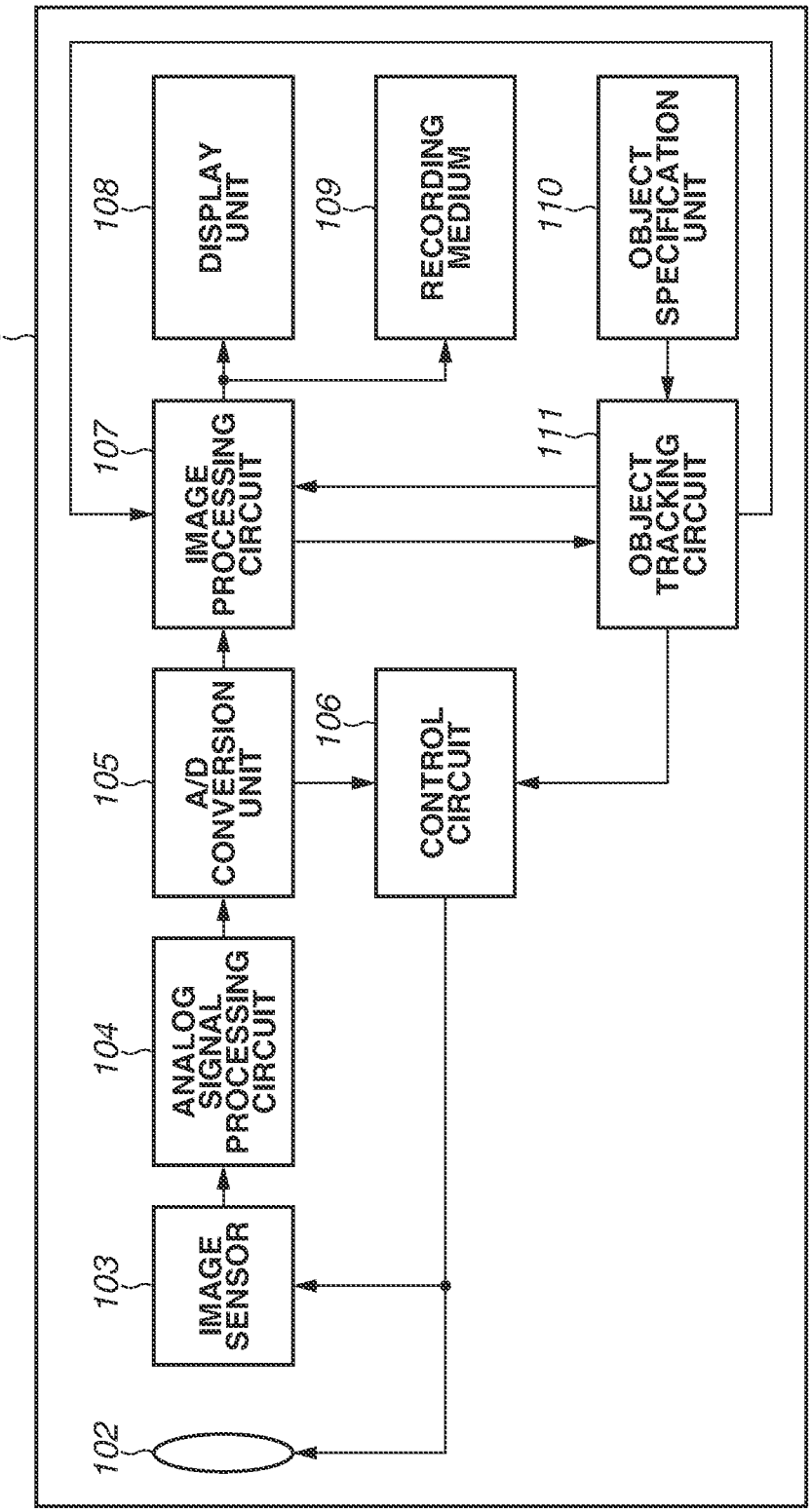

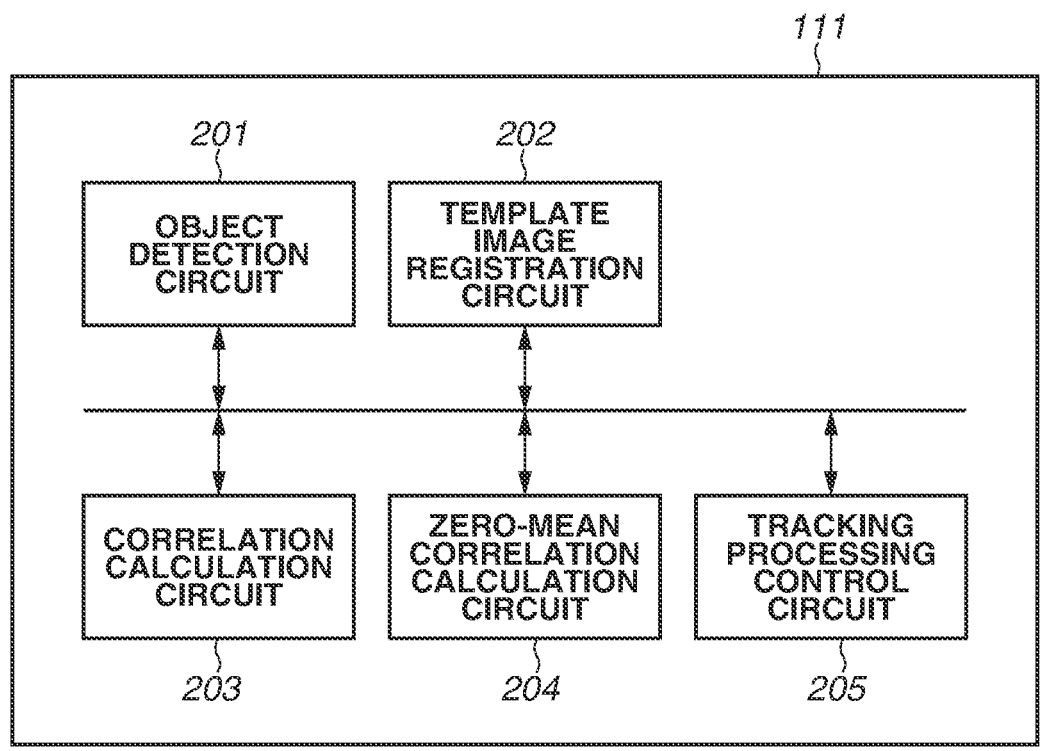

TEMPLATE IMAGE

SEARCH IMAGE

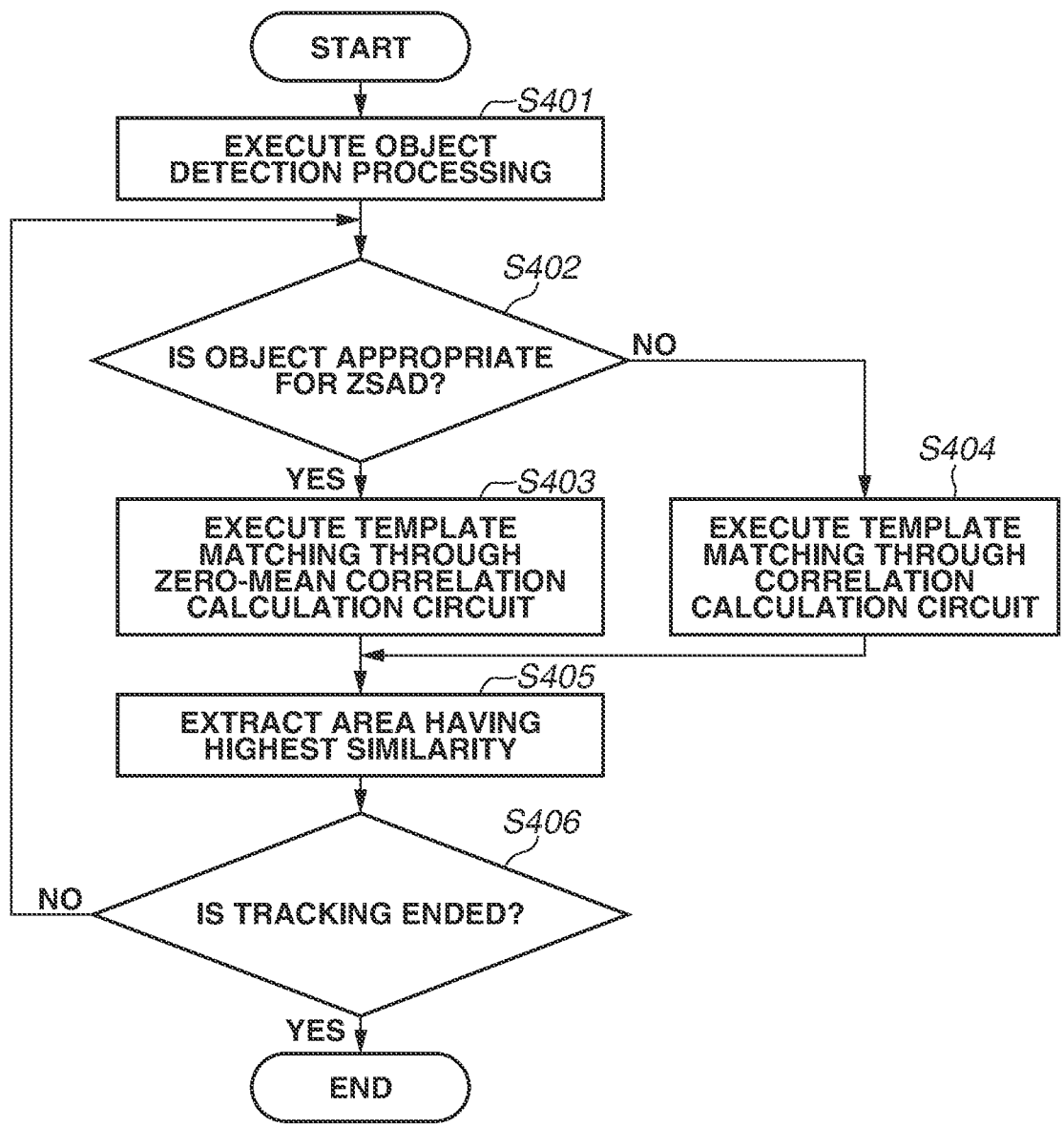

IMAGE PROCESSING APPARATUS THAT TRACKS OBJECT AND IMAGE PROCESSING METHOD

BACKGROUND OF THE DISCLOSURE

Field of the Disclosure

The present disclosure relates to an image processing apparatus and an image processing method, particularly relates to a technique for tracking a specific object included in an image.

Description of the Related Art

A technique for detecting a specific object from images sequentially provided in chronological order and tracking the detected object has been known.

A technique for extracting and tracking an optional object included in a captured image and optimizing a focus state and an exposure state of the object has been known. Japanese Patent Application Laid-Open No. 2005-318554 discusses an image processing apparatus that detects (extracts) and tracks a position of a face included in a captured image and captures an image of the face with appropriate exposure while adjusting a focus to the face. Japanese Patent Application Laid-Open No. 2001-060269 discusses tracking processing for detecting a face detected from one frame from a subsequent frame by using a template matching method.

Japanese Patent Application Laid-Open No. 2010-11441 discusses methods such as a sum of absolute difference (SAD) method and a sum of squared difference (SSD) method used for executing template matching. In the SAD and SSD methods, it is determined that a correlation between areas is high if a difference between an input image and a template image is small. Thus, for example, if brightness of the input image is changed because of emission of an electronic flash, a difference between the images will be increased, and an area of a specific object is therefore determined to be the area having a low correlation. Further, as a template matching method, there is also provided a technique called a zero-mean sum of absolute difference (ZSAD) method. In this technique, a correlation is calculated from a sum of absolute difference of pixel values after an average luminance value of a comparison area is subtracted from each of luminance values of the comparison area. Thus, a difference between the input image and the template image will not be increased even if the brightness of the input image is changed because of emission of an electronic flash. Therefore, a specific object area is determined to be an area having a high correlation.

In the ZSAD method, however, a correlation is calculated from an alternate current (AC) component from which a direct current (DC) component is eliminated. For example, in a case where a difference between a template image in solid gray and an input image including a background area in solid white is acquired, the template image has a high correlation with the background area. Thus, there arises an issue in which the background area is erroneously determined to be the specific object area.

SUMMARY OF THE DISCLOSURE

In order to solve the above-described issue, the present disclosure is directed to an image processing apparatus capable of stably executing object tracking by adaptively switching between a correlation calculation unit for calculating a correlation from a state where a direct current (DC) component is included and a correlation calculation unit for calculating a correlation from only an alternate current (AC) component from which the DC component is eliminated.

According to an aspect of the present disclosure, an image processing apparatus includes an analysis unit configured to analyze an image, an extraction unit configured to extract a reference image corresponding to a specific object, and a first correlation calculation unit and a second correlation calculation unit configured to presume an area having a high correlation in an input image by using the reference image. The first correlation calculation unit is a correlation calculation unit configured to execute presumption based on components including a direct current (DC) component. The second correlation calculation unit is a correlation calculation unit configured to execute presumption based on an alternate current (AC) component, from which the DC component is eliminated. Based on at least any one of a detection result of the specific object, a feature amount of the specific object, and an analysis result of an imaging scene, acquired by the analysis unit, the first correlation calculation unit and the second correlation calculation unit are switched when the area is presumed.

According to another aspect of the present disclosure, an image processing apparatus includes at least one processor and a memory holding a program which makes the processor function as an imaging condition decision unit configured to decide an imaging condition, an extraction unit configured to extract a reference image corresponding to a specific object, and a first correlation calculation unit and a second correlation calculation unit configured to presume an area having a high correlation in an input image bye using the reference image. The first correlation calculation unit is a correlation calculation unit configured to execute presumption based on components including a DC component. The second correlation calculation unit is a correlation calculation unit configured to execute presumption based on an AC component, from which the DC component is eliminated, and wherein, based on the imaging condition decided by the imaging condition decision unit, the first correlation calculation unit and the second correlation calculation unit are switched when the area is presumed.

According to still another aspect of the present disclosure, an image processing method includes analyzing an image, extracting a reference image corresponding to a specific object, and presuming an area having a high correlation in an input image by using the reference image, through a first correlation calculation unit and a second correlation calculation unit. The first correlation calculation unit is a correlation calculation unit configured to execute presumption based on components including a DC component. The second correlation calculation unit is a correlation calculation unit configured to execute presumption based on an AC component, from which the DC component is eliminated. Based on at least any one of a detection result of the specific object, a feature amount of the specific object, and an analysis result of an imaging scene, acquired by the analyzing, the first correlation calculation unit and the second correlation calculation unit are switched when the area is presumed.

Further features of the present disclosure will become apparent from the following description of exemplary embodiments with reference to the attached drawings.

BRIEF DESCRIPTION OF THE DRAWINGS

FIG. 1 is a block diagram illustrating a schematic configuration of an image processing apparatus.

FIG. 2 is a block diagram illustrating a configuration of an object tracking circuit according to a first exemplary embodiment of the present disclosure.

FIG. 4 is a flowchart illustrating object tracking processing according to the first exemplary embodiment of the present disclosure.

DESCRIPTION OF THE EMBODIMENTS

Figure 3A:
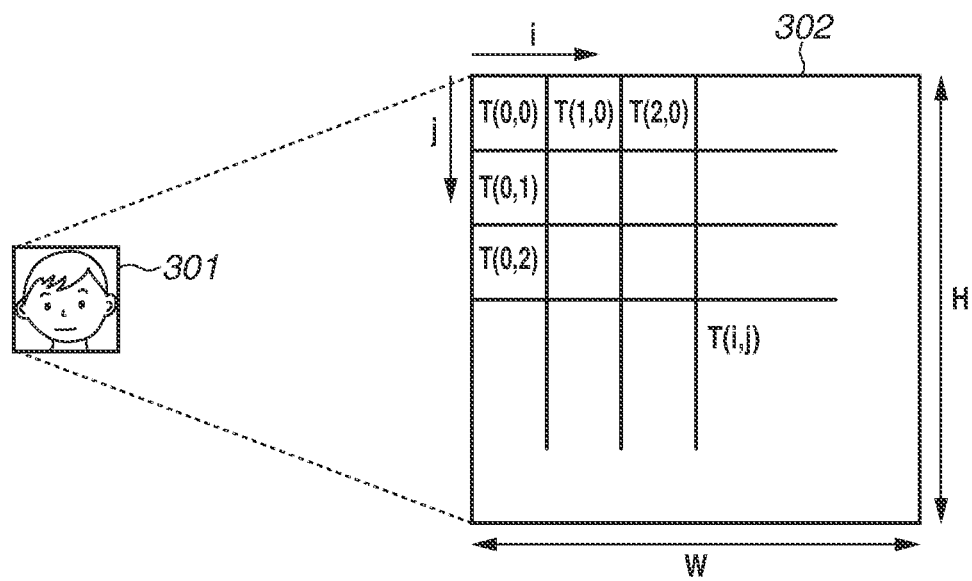
FIGS. 3A and 3B are diagrams illustrating template matching.

Hereinafter, preferred exemplary embodiments of the present disclosure will be described in detail with reference to the attached drawings. The below-described exemplary embodiments are not intended to limit the present disclosure according to the scope of the appended claims. Although a plurality of features is described in the exemplary embodiments, not all of the features are necessary for the present disclosure, and the features may be combined optionally. Further, in the appended drawings, a same reference numeral is applied to constituent elements similar to each other, and descriptions thereof will be simplified or omitted.

FIG. 1 is a block diagram illustrating a schematic configuration of an image processing apparatus 101 according to a first exemplary embodiment of the present disclosure. In the present exemplary embodiment, for example, the image processing apparatus 101 is embodied in a digital still camera or a digital video camera which captures an image of an object. Further, the image processing apparatus 101 also functions as an object tracking apparatus that tracks an object included in images sequentially input thereto in chronological order.

The image processing apparatus 101 includes an optical system 102 such as lenses, an image sensor 103, an analog signal processing circuit 104, an analog-to-digital (A/D) conversion unit 105, a control circuit 106, an image processing circuit 107, a display unit 108, a recording medium 109, an object specification unit 110, and an object tracking circuit 111.

Light that forms an image of an object is condensed by the optical system 102, and is incident on the image sensor 103 configured of a charge-coupled device (CCD) image sensor or a complementary metal-oxide semiconductor (CMOS) image sensor. The image sensor 103 outputs an electric signal according to intensity of incident light in pixel units. In other words, the image sensor 103 photoelectrically converts an object image formed by the optical system 102. The electric signal output from the image sensor 103 is an analog electric signal that expresses an object image captured by the image sensor 103.

The analog signal processing circuit 104 executes analog signal processing, such as correlated double sampling (CDS), on the video signal output from the image sensor 103. The video signal output from the analog signal processing circuit 104 is converted into a format of digital data by the A/D conversion unit 105, and input to the control circuit 106 and the image processing circuit 107.

The control circuit 106 is a control unit including at least one processor, such as a central processing unit (CPU) or a micro-controller, and a circuit. The control circuit 106 controls the operation of the image processing apparatus 101. Specifically, the control circuit 106 loads a program code stored in a memory, such as a read only memory (ROM), to a work area of a random access memory (RAM), and sequentially executes the program code to control respective units of the image processing apparatus 101.

The control circuit 106 controls imaging conditions, such as a focus state and an exposure state, when image capturing is executed by the image sensor 103. Specifically, the control circuit 106 controls a focus control mechanism and an exposure control mechanism (both of them not illustrated) of the optical system 102 based on a video signal output from the A/D conversion unit 105. The focus control mechanism is, for example, an actuator which drives a lens included in the optical system 102 in an optical axis direction. The exposure control mechanism is, for example, an actuator that drives an aperture and a shutter. The control circuit 106 also executes reading control of the image sensor 103, i.e., control of output timing and pixel signal output of the image sensor 103.

The image processing circuit 107 executes image processing, such as gamma correction processing and white balance processing, on a video signal output from the A/D conversion unit 105. The image processing circuit 107 also has a function of executing image processing using information about an object area in an image supplied from the object tracking circuit 111 described below, in addition to executing typical image processing.

The video signal output from the image processing circuit 107 is transmitted to the display unit 108. The display unit 108 is configured of, for example, a liquid crystal display (LCD) or an organic electroluminescence (EL) display. The display unit 108 displays a video signal, and functions as an electronic view finder (EVF) by sequentially displaying images that are chronologically and sequentially captured by the image sensor 103 on the display unit 108. The display unit 108 also displays, for example, a rectangular shape indicating an object area including an object tracked by the object tracking circuit 111.

The video signal output from the image processing circuit 107 is recorded in the recording medium 109, such as a detachable memory card. A recording destination of the video signal can be a built-in memory of the image processing apparatus 101 or an external apparatus (not illustrated) communicably connected thereto via a communication interface.

The object specification unit 110 is an input interface, such as a touch panel arranged on the display unit 108, or keys and buttons arranged on the housing of the image processing apparatus 101. For example, a user (i.e., photographer) can specify an object as a tracking target by specifying an area of a desired object from the video signal displayed on the display unit 108. There are no particular restrictions on the method for specifying an optional area from an image by using a touch panel, keys, or buttons, so that any known method can be used.

The object tracking circuit 111 tracks an object included in the images captured at different time, and chronologically and sequentially supplied from the image processing circuit 107. Based on a pixel pattern of the object, the object tracking circuit 111 presumes, from the images sequentially supplied thereto, an object area of the object specified by the object specification unit 110. The object tracking circuit 111 also includes an object detection circuit for detecting a specific object such as a face, so that the object tracking circuit 111 may track a detected object. The object tracking circuit 111 will be described below in detail.

In order to control the above-described focus control mechanism and the exposure control mechanism, the control circuit 106 can use the information about the object area supplied from the object tracking circuit 111, Specifically, the control circuit 106 executes focus control using a contrast value of the object area and exposure control using a luminance value of the object area. Through the above-described control, the image processing apparatus 101 can execute image capturing processing with consideration of the specific object area included in the captured image.

The object tracking circuit 111 will now be described in detail. The object tracking circuit 111 functions as a matching unit. The object tracking circuit 111 is a matching unit that takes a partial image expressing a tracking target object as a template image (reference image), collates a partial area of a supplied image with the template image while changing a partial area to be collated with, and presumes an area having a high correlation (hereinafter, referred to as template matching).

FIG. 2 is a block diagram illustrating the object tracking circuit 111. The object tracking circuit 111 includes an object detection circuit 201, a template image registration circuit 202, a correlation calculation circuit 203, a zero-mean correlation calculation circuit 204, and a tracking processing control circuit 205, Respective blocks of the object detection circuit 201 to the tracking processing control circuit 205 are connected to each other via a bus, so that data can be exchanged therebetween.

The object detection circuit 201 detects and specifies an object as a tracking target from a supplied image. For example, a human face is typically specified as a tracking target object. In this case, the object detection circuit 201 specifies a human face area as an object area, and specifies the human face area as a tracking target. As an object detection method, the object detection circuit 201 uses a machine-learning type detection circuit that executes identification through an identifier trained by a machine learning technique. The detection circuit uses a "Deep Learning" technique. The detection circuit learns from a large-scale data set by using a multi-layer neural network, and automatically extracts a feature amount to specify a face area, instead of executing conventional feature-amount extraction using a rule base created by a person. In addition, a rule-based feature amount extraction method can also be used for the object detection circuit 201.

The template image registration circuit 202 registers a partial area that expresses a tracking target object as a template image.

Each of the correlation calculation circuit 203 and the zero-mean correlation calculation circuit 204 collates a partial area of the supplied image with a template image registered by the template image registration circuit 202 while changing a partial area to be collated with, and presumes an area having a high correlation (i.e., template matching).

Details of the template matching will be described with reference to FIGS. 3A and 3B. FIG. 3A is a diagram illustrating an example of a template image to be used for the template matching, A template image 301 is a partial area that expresses a tracking target object, and a pixel pattern of this area is treated as a feature amount. A feature amount 302 expresses a feature amount of coordinates of each of the areas in the template image 301. In the present exemplary embodiment, a luminance signal of pixel data is taken as a feature amount. A feature amount T(i,j) is expressed by the following formula 1:

$$T(i,j)=(T(0,0),T(0,1),\ldots,T(W-1,H-1)) \quad (1),$$

where (i,j) are coordinates in a template area, W is the number of horizontal pixels, and H is the number of vertical pixels.

Figure 3B:
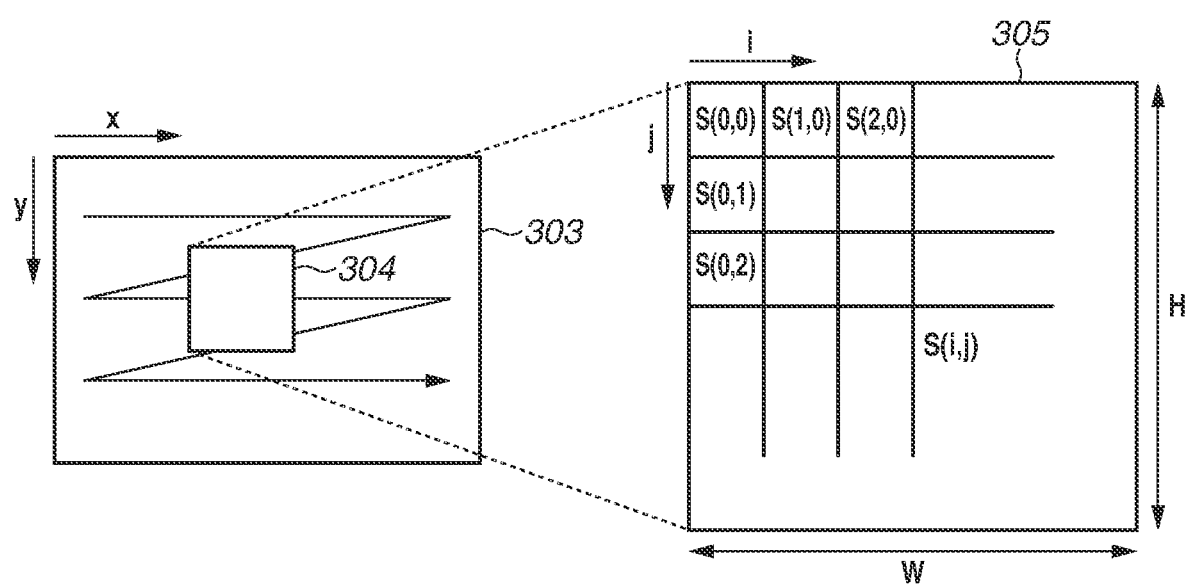

FIG. 3B is a diagram illustrating information of an image to be searched for a tracking target. An image 303 is an image of an area where matching processing is executed. Coordinates in the image to be searched are expressed as (x,y). A partial area 304 is an area where an evaluation value of the matching is acquired. A feature amount 305 expresses a feature amount of the partial area 304, and similarly to the case of the template image 301, a luminance signal of image data is taken as a feature amount. A feature amount S(i,j) is expressed by the following formula 2:

$$S(i,j)=(S(0,0),S(0,1),\ldots,S(W-1,H-1)) \quad (2),$$

where (i,j) are coordinates in the partial area 304, W is the number of horizontal pixels, and H is the number of vertical pixels.

In the present exemplary embodiment, the correlation calculation circuit 203 uses a sum of absolute difference (SAD) value, and the zero-mean correlation calculation circuit 204 uses a zero-mean sum of absolute difference (ZSAD) value, for calculating similarity evaluation between the template image 301 and the partial area 304.

The SAD value of the correlation calculation circuit 203 is calculated by the following formula 3.

$$V(x,y)=\Sigma_y\Sigma_x|T(x,y)-S(x,y)| \quad (3)$$

An SAD value V(x,y) is calculated while shifting the partial area 304 by one pixel in the order from an upper left end of the image 303 as a search area. The coordinates (x,y) where a calculated. SAD value V(x,y) becomes minimum represents a position where the partial area 304 is the most similar to the template image 301. In other words, a position indicating the minimum value is a position in the search image where the tracking target object is likely to exist.

In the present exemplary embodiment, one dimensional information about a luminance signal is used as the feature amount. However, three dimensional information such as a luminosity signal, a hue signal, and a saturation signal may also be used as the feature amount. Further, an SAD value is used to calculate a matching evaluation value in the correlation calculation circuit 203. However, another calculation method, such as a sum of squared difference (SSD) or a normalized correlation coefficient (NCC), can also be used.

The ZSAD value of the zero-mean correlation calculation circuit 204 is calculated by the following formula 4:

$$V(x, y) = \sum_{y}\sum_{x} \left| \left(T(x, y) - \overline{T}\right) - \left(S(x, y) - \overline{S}\right) \right|, \text{ where} \quad (4)$$

$$\overline{T} = \frac{1}{MW} \sum_{y}\sum_{x} T(x, y)$$

$$\overline{S} = \frac{1}{MW} \sum_{y}\sum_{x} S(x, y).$$

When a ZSAD value is calculated, an average value of the feature amount T(i,j) of the template image 301 and an average value of the feature amount S(i,j) of the partial area 304 are calculated. After each of the average values is subtracted from each of the feature amounts T(i,j) and S(i,j), a difference between the feature amount T(i,j) of the template image 301 and the feature amount S(i,j) of the partial area 304 of the search image is acquired.

A ZSAD value V(x,y) is calculated while shifting the partial area 304 by one pixel in the order from the top left area of the image 303 as a search area. The coordinates (x,y) where a calculated ZSAD value V(x,y) becomes minimum represents a position where the partial area 304 is the most similar to the template image 301. In other words, a position indicating the minimum value is a position in the search image where a tracking target object is likely to exist.

In the present exemplary embodiment, one dimensional information about a luminance signal is used as the feature amount. However, three dimensional information, such as luminosity signal, a hue signal, and a saturation signal, may also be used as the feature amount. Further, a ZSAD value is used to calculate a matching evaluation value in the zero-mean correlation calculation circuit 204. However, another zero-mean correlation calculation method such as a zero-mean sum of squared difference (ZSSD) or a zero-mean normalized correlation coefficient (ZNCC) can also be used.

The tracking processing control circuit 205 includes a CPU, and executes control of object tracking processing. The respective circuits, i.e., the object detection circuit 201 to the zero-mean correlation calculation circuit 204, execute processing via the tracking processing control circuit 205. Further, the tracking processing control circuit 205 decides whether to use the correlation calculation circuit 203 or the zero-mean correlation calculation circuit 204, based on a detection result acquired by the object detection circuit 201. Furthermore, based on the correlation acquired by the selected correlation calculation circuit, the tracking processing control circuit 205 decides an object area having the highest similarity, FIG. 4 is a flowchart illustrating a characteristic processing flow of the present disclosure, executed by the image processing apparatus 101 according to the present exemplary embodiment of the present disclosure. The processing steps illustrated in the flowchart are executed by the control circuit 106 or by the respective units of the image processing apparatus 101 based on the instructions issued by the control circuit 106.

In step S401 of the flowchart illustrated in FIG. 4, the image processing apparatus 101 reads an input image of a frame t 0, and the object detection circuit 201 extracts an object area by executing object detection processing such as face detection processing.

In step S402, the tracking processing control circuit 205 determines whether the object area acquired as a result of the object detection processing is appropriate for the ZSAD method, Specifically, objects, such as a face, a head, and the entire body of a human, and a face and a head of an animal other than the human, are determined to be the objects appropriate for the ZSAD method because it is assumed that these objects contain plenty of alternate current (AC) components (high-frequency components) in addition to direct current (DC) components. In contrast, an object such as a ball used for sports is determined to be the object inappropriate for the ZSAD method because it is assumed that the object contains few AC components.

If the object area is determined to be appropriate for the ZSAD method in step S402 (YES in step S402), the processing proceeds to step S403. In step S403, the zero-mean correlation calculation circuit 204 reads an input image of a frame t=1, and executes template matching processing of a partial area of the input image and a template image registered in the template image registration circuit 202 at the frame t=0 by using the ZSAD method.

If the object area is determined to be inappropriate for the ZSAD method in step S402 (NO in step S402), the processing proceeds to step S404, in step S404, the correlation calculation circuit 203 reads an input image of a frame t=1, and executes template matching processing of a partial area of the input image and a template image registered in the template image registration circuit 202 at the frame t=0 by using the SAD method.

After all of the areas of the input image are compared to the template image, the correlation calculation circuit 203 presumes that an area having the highest correlation is the object area in the frame t=1, and acquires a matching result.

In step S405, the tracking processing control circuit 205 determines that an image corresponding to the area having the highest similarity in the input image is the object area, and extracts the image corresponding to the area. The tracking processing control circuit 205 outputs the extracted image to the template image registration circuit 202. The tracking processing control circuit 205 also outputs the information about the determined object area to the control circuit 106 and the image processing circuit 107.

If the tracking processing is not ended in step S406 (NO in step S406), the processing returns to step S402, so that the tracking processing control circuit 205 determines whether the object is appropriate for the ZSAD method and executes the above-described processing flow again.

As described above, the object detection processing is executed by the object detection circuit 201, and the tracking processing control circuit 205 selects whether template matching should be executed by using the SAD method or the ZSAD method based on a result of the object detection processing. Thus, object tracking can be executed stably.

Figure 5:
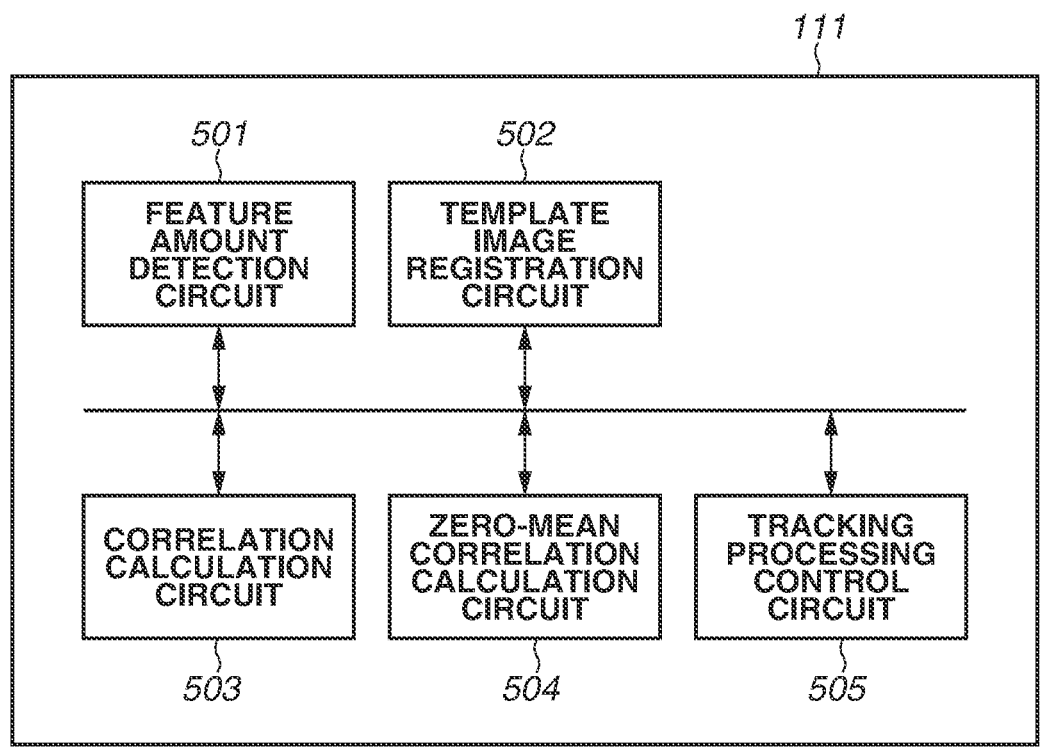
FIG. 5 is a block diagram illustrating a configuration of an object tracking circuit according to a second exemplary embodiment of the present disclosure.

Next, one example of the image processing apparatus 101 according to a second exemplary embodiment of the present disclosure will be explained with reference to a block diagram in FIG. 5 illustrating a configuration of an object tracking circuit and a flowchart in FIG. 6, mainly describing a configuration different from the configuration described in the first exemplary embodiment. A schematic configuration of the image processing apparatus 101 in FIG. 1 is similar to the configuration described in the first exemplary embodiment.

In the present exemplary embodiment of the present disclosure, the object tracking circuit calculates a feature amount and decides whether to use a correlation calculation circuit or a zero-mean correlation calculation circuit depending on the feature amount.

FIG. 5 is a block diagram of an object tracking circuit 111. The object tracking circuit 111 includes a feature amount detection circuit 501, a template image registration circuit 502, a correlation calculation circuit 503, a zero-mean correlation calculation circuit 504, and a tracking processing control circuit 505. Herein, respective circuits of the template image registration circuit 502, the correlation calculation circuit 503, and the zero-mean correlation calculation circuit 504 are similar to the circuits of the template image registration circuit 202, the correlation calculation circuit 203, and the zero-mean correlation calculation circuit 204 illustrated in FIG. 2, so that descriptions thereof will be omitted.

The feature amount detection circuit 501 uses a differential filter to extract an edge from an image area of the object specified by the object specification unit 110, and calculates an integrated value of the extracted edge. Based on the integrated value of the edge acquired by the feature amount detection circuit 501, the tracking processing control circuit 505 decides whether to use the correlation calculation circuit 503 or the zero-mean correlation calculation circuit 504.

Figure 6:
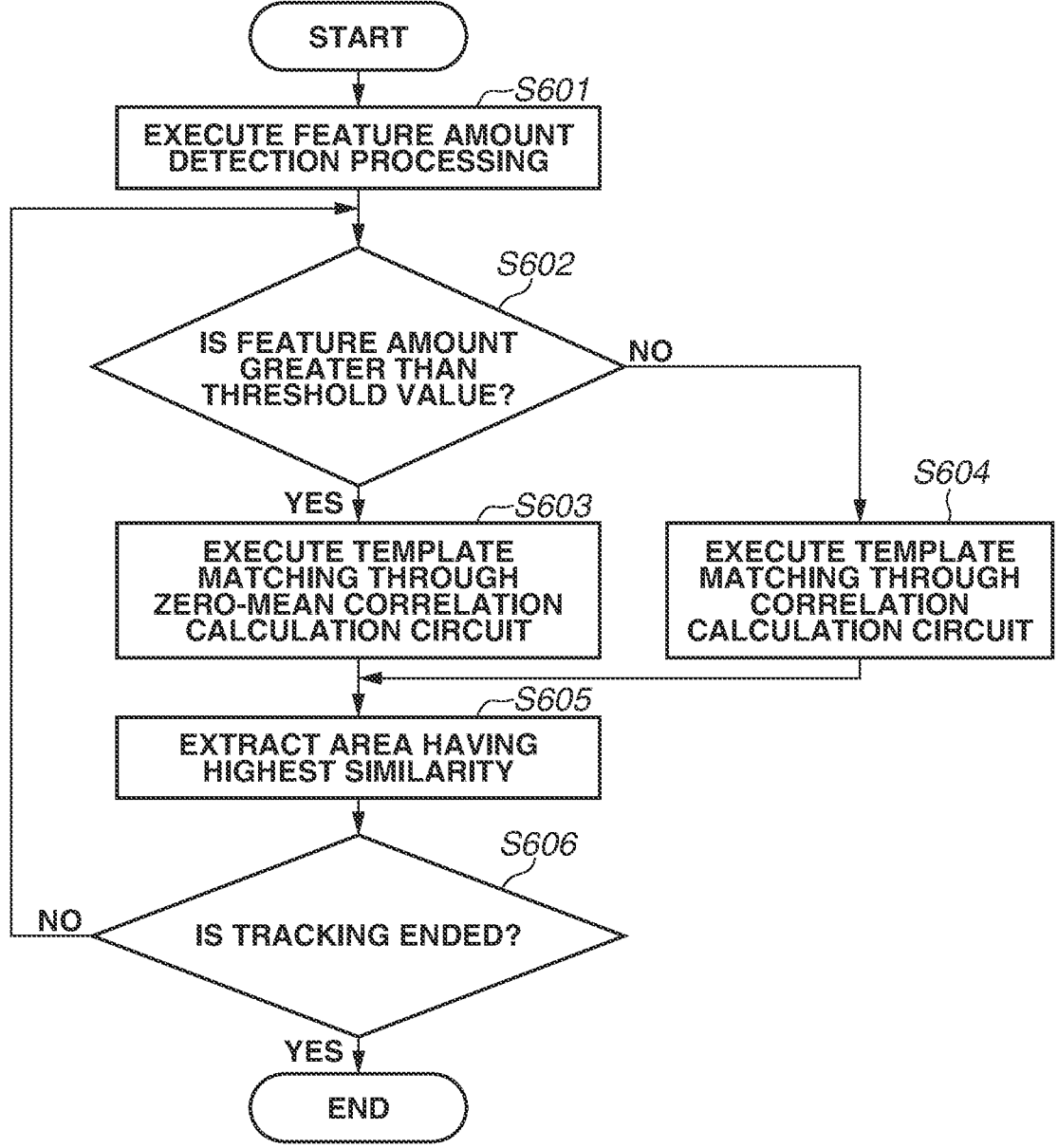
FIG. 6 is a flowchart illustrating object tracking processing according to the second exemplary embodiment of the present disclosure.

FIG. 6 is a flowchart illustrating the processing according to the present exemplary embodiment of the present disclosure. The processing steps illustrated in the flowchart are executed by the control circuit 106 or by the respective units of the image processing apparatus 101 based on the instructions issued by the control circuit 106.

In step S601 of the flowchart in FIG. 6, an input image of a frame t=0 is read by the image processing apparatus 101, and an object area specified by the object specification unit 110 is registered in the template image registration circuit 502. In step S601, the feature amount detection circuit 501 also uses a differential filter to extract an edge from the registered template image, and calculates a feature amount from an integrated value of the extracted edge.

In step S602, the tracking processing control circuit 505 determines whether the object is appropriate for the ZSAD method, based on the feature amount acquired as a result of the feature amount detection processing. In a case where the feature amount is greater than a threshold value previously set by the image processing apparatus 101, the tracking processing control circuit 505 determines that the feature amount is large and selects the ZSAD method. In contrast, if the feature amount is less or equal to the threshold value, the tracking processing control circuit 505 determines that the feature amount is small, and determines that the object is not appropriate for the ZSAD method.

If the object is determined to be the object appropriate for the ZSAD method in step S602 (YES in step S602), the processing proceeds to step S603. In step S603, the zero-mean correlation calculation circuit 504 reads an input image of a next frame t=1, and executes template matching processing of a partial area of the input image and a template image registered in the template image registration circuit 502 at the input image of the frame t=0 by using the ZSAD method.

If the object is determined to be the object inappropriate for the ZSAD method in step S602 (NO in step S602), the processing proceeds to step S604. In step S604, the correlation calculation circuit 503 reads an input image of a next frame t=1, and executes template matching processing of a partial area of the input image and a template image registered in the template image registration circuit 502 at the input image of the frame t=0 by using the SAD method. After all of the areas of the input image are compared to the template image, the correlation calculation circuit 503 presumes that an area having the highest correlation is the object area in the frame t=1, and acquires a matching result.

In step S605, the tracking processing control circuit 505 determines that an image corresponding to the area hawing the highest similarity in the input image is the object area, and extracts the image corresponding to the area. The tracking processing control circuit 505 outputs the extracted image to the template image registration circuit 502. The tracking processing control circuit 505 also outputs the information about the determined object area to the control circuit 106 and the image processing circuit 107.

If the tracking processing is not ended in step S606 (NO in step S606), the processing returns to step S602, so that the tracking processing control circuit 505 determines whether the object is appropriate for the ZSAD method and executes the above-described processing flow again.

As described above, according to the present exemplary embodiment, a feature amount is calculated by the feature amount detection circuit 501, and the tracking processing control circuit 505 selects whether template matching should be executed by using the SAD method or the ZSAD method based on the feature amount. Thus, object tracking can be executed stably.

Figure 7:
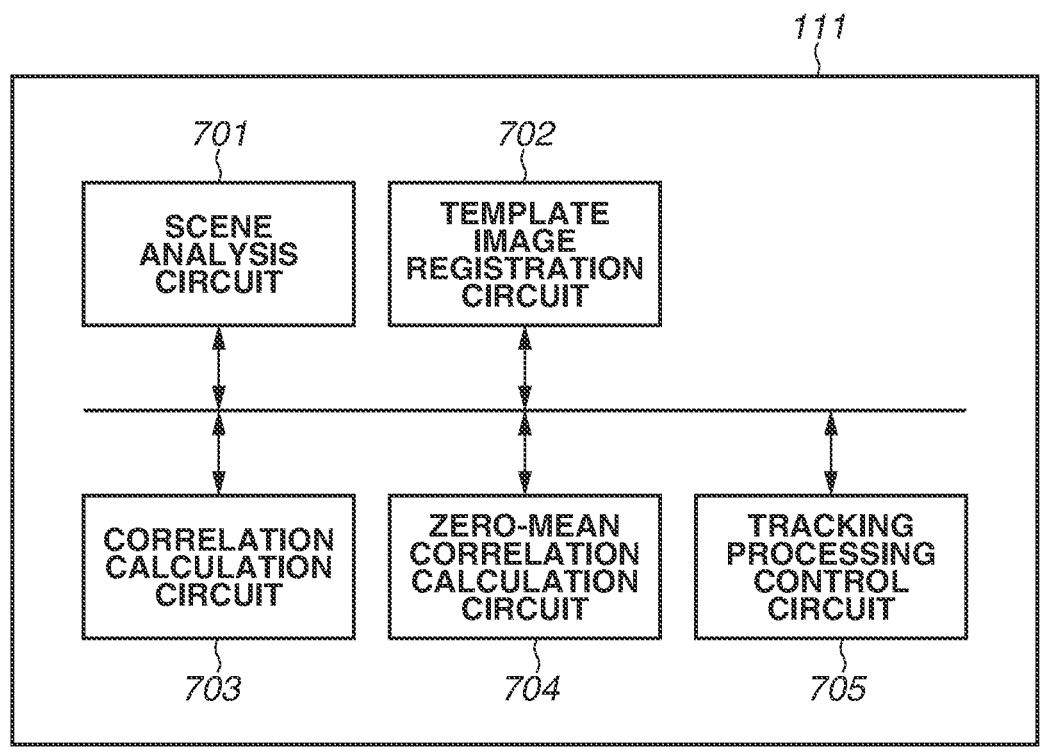
FIG. 7 is a block diagram illustrating a configuration of an object tracking circuit according to a third exemplary embodiment of the present disclosure.

Next, one example of the image processing apparatus 101 according to a third exemplary embodiment of the present disclosure will be explained with reference to a block diagram in FIG. 7 illustrating a configuration of an object tracking circuit and a flowchart in FIG. 8, mainly describing a configuration different from the configuration described in the first exemplary embodiment, A schematic configuration of the image processing apparatus 101 in FIG. 1 is similar to the configuration described in the first exemplary embodiment.

In the present exemplary embodiment of the present disclosure, the object tracking circuit analyzes an imaging scene and decides whether to use a correlation calculation circuit or a zero-mean correlation calculation circuit based on the analysis result.

FIG. 7 is a block diagram of an object tracking circuit 111. The object tracking circuit 111 includes a scene analysis circuit 701, a template image registration circuit 702, a correlation calculation circuit 703, a zero-mean correlation calculation circuit 704, and a tracking processing control circuit 705. Herein, respective circuits of the template image registration circuit 702, the correlation calculation circuit 703, and the zero-mean correlation calculation circuit 704 are similar to the circuits of the template image registration circuit 202, the correlation calculation circuit 203, and the zero-mean correlation calculation circuit 204 illustrated in FIG. 2, so that descriptions thereof will be omitted.

The scene analysis circuit 701 observes a variation of luminance signals of images of a plurality of frames. Specifically, the scene analysis circuit 701 acquires a difference between an average luminance value of an image of an (n−1)-th frame and an average luminance value of an image of an n-th frame. Tracking processing control circuit 705 then determines whether the difference value exceeds a preset threshold value. The above-described processing is executed on a plurality of frames, and the tracking processing control circuit 705 decides whether to use the correlation calculation circuit 703 or the zero-mean correlation calculation circuit 704 depending on whether any one of the difference values exceeds the threshold value.

Figure 8:
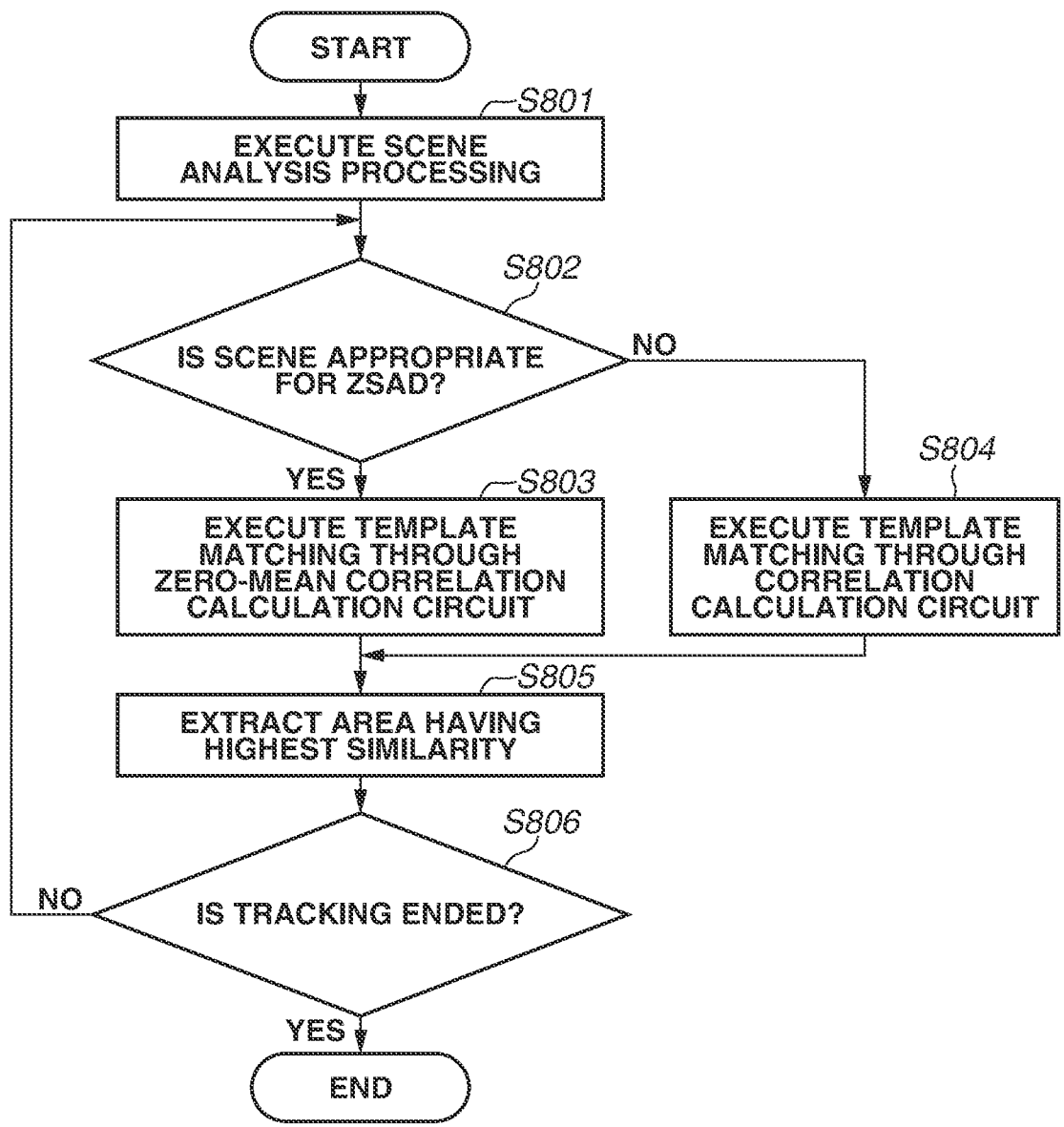
FIG. 8 is a flowchart illustrating object tracking processing according to the third exemplary embodiment of the present disclosure.

FIG. 8 is a flowchart illustrating the processing according to the present exemplary embodiment of the present disclosure. The processing steps illustrated in the flowchart are executed by the control circuit 106 or by the respective units of the image processing apparatus 101 based on the instructions issued by the control circuit 106.

In step S801 of the flowchart in FIG. 8, the image processing apparatus 101 reads an input image of a frame t=0 and calculates an average luminance value, Next, an input image at a next frame t=1 is read, and an average luminance value is calculated. Then, a difference between the average luminance values of the frame t=0 and the frame t=1 is calculated. In step S801, an input image of the frame t=1 is read, and an object area specified by the object specification unit 110 is registered in the template image registration circuit 702.

In step S802, if the calculated difference value is greater than the threshold value previously set by the image processing apparatus 101, the tracking processing control circuit 705 determines that a luminance variation is large, and selects the ZSAD method. In contrast, if the difference value is less than or equal to the threshold value, the tracking processing control circuit 705 determines that a luminance variation is small, and determines that the object is not appropriate for the ZSAD method.

If the object is determined to be the object appropriate for the ZSAD method in step S802 (YES in step S802), the processing proceeds to step S803, In step S803, the zero-mean correlation calculation circuit 704 reads an input image of a next frame t=2, and executes template matching processing of a partial area of the input image and a template image registered at the input image of the frame t=1 by using the ZSAD method.

If the object is determined to be the object inappropriate for the ZSAD method in step S802 (NO in step S802), the processing proceeds to step S804. In step S804, the correlation calculation circuit 703 reads an input image of a next frame t=2, and executes template matching processing of a partial area of the input image and a template image registered at the input image of the frame t=1 by using the SAD method. After all of the areas of the input image are compared to the template image, the correlation calculation circuit 703 presumes that an area having the highest correlation is the object area in the frame t=2, and acquires a matching result.

In step S805, the tracking processing control circuit 705 determines that an image corresponding to the area having the highest similarity in the input image is the object area, and extracts the image corresponding to the area. The tracking processing control circuit 705 outputs the extracted image to the template image registration circuit 702. The tracking processing control circuit 705 also outputs the information about the determined object area to the control circuit 106 and the image processing circuit 107.

If the tracking processing is not ended in step S806 (NO in step S806), the processing returns to step S802, so that the tracking processing control circuit 705 determines whether the object is appropriate for the ZSAD method, and executes the above-described processing flow again.

As described above, according to the present exemplary embodiment, scene analysis is executed by the scene analysis circuit 701, and the tracking processing control circuit 705 selects whether template matching should be executed by using the SAD method or the ZSAD method based on a result of the scene analysis. Thus, object tracking can be executed stably.

Figure 9:
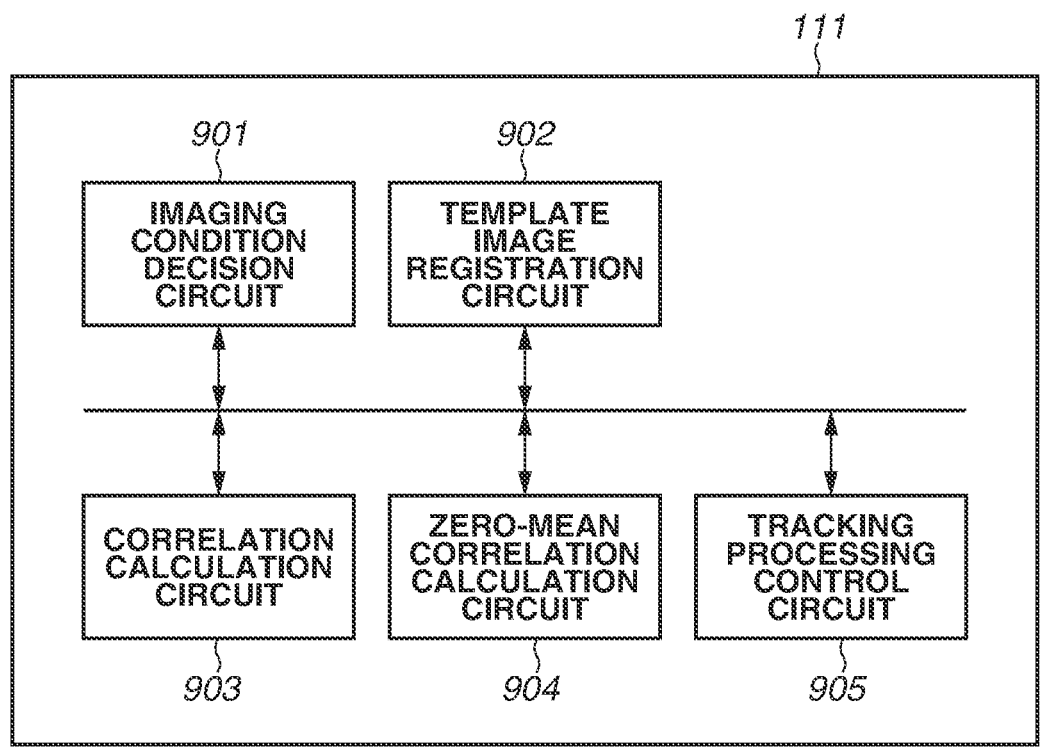
FIG. 9 is a block diagram illustrating a configuration of an object tracking circuit according to a fourth exemplary embodiment of the present disclosure.

Next, one example of the image processing apparatus 101 according to a fourth exemplary embodiment of the present disclosure will be explained with reference to a block diagram in FIG. 9 illustrating a configuration of an object tracking circuit and a flowchart in FIG. 10, mainly describing a configuration different from the configuration described in the first exemplary embodiment. A schematic configuration of the image processing apparatus 101 in FIG. 1 is similar to the configuration described in the first exemplary embodiment.

In the present exemplary embodiment of the present disclosure, the object tracking circuit decides an imaging condition, and decides whether to use a correlation calculation circuit or a zero-mean correlation calculation circuit based on the imaging condition.

FIG. 9 is a block diagram of an object tracking circuit 111. The object tracking circuit 111 includes an imaging condition decision circuit 901, a template image registration circuit 902, a correlation calculation circuit 903, a zero-mean correlation calculation circuit 904, and a tracking processing control circuit 905. Herein, respective circuits of the template image registration circuit 902, the correlation calculation circuit 903, and the zero-mean correlation calculation circuit 904 are similar to the circuits of the template image registration circuit 202 the correlation calculation circuit 203, and the zero-mean correlation calculation circuit 204 illustrated in FIG. 2, so that descriptions thereof will be omitted.

The imaging condition decision circuit 901 decides conditions of an exposure, an electronic flash, and a white balance. Specifically, the imaging condition decision circuit 901 decides settings of the exposure, the electronic flash, and the white balance based on the instructions from the user. Based on the imaging condition decided by the imaging condition decision circuit 901, the tracking processing control circuit 905 decides whether to use the correlation calculation circuit 903 or the zero-mean correlation calculation circuit 904.

Figure 10:
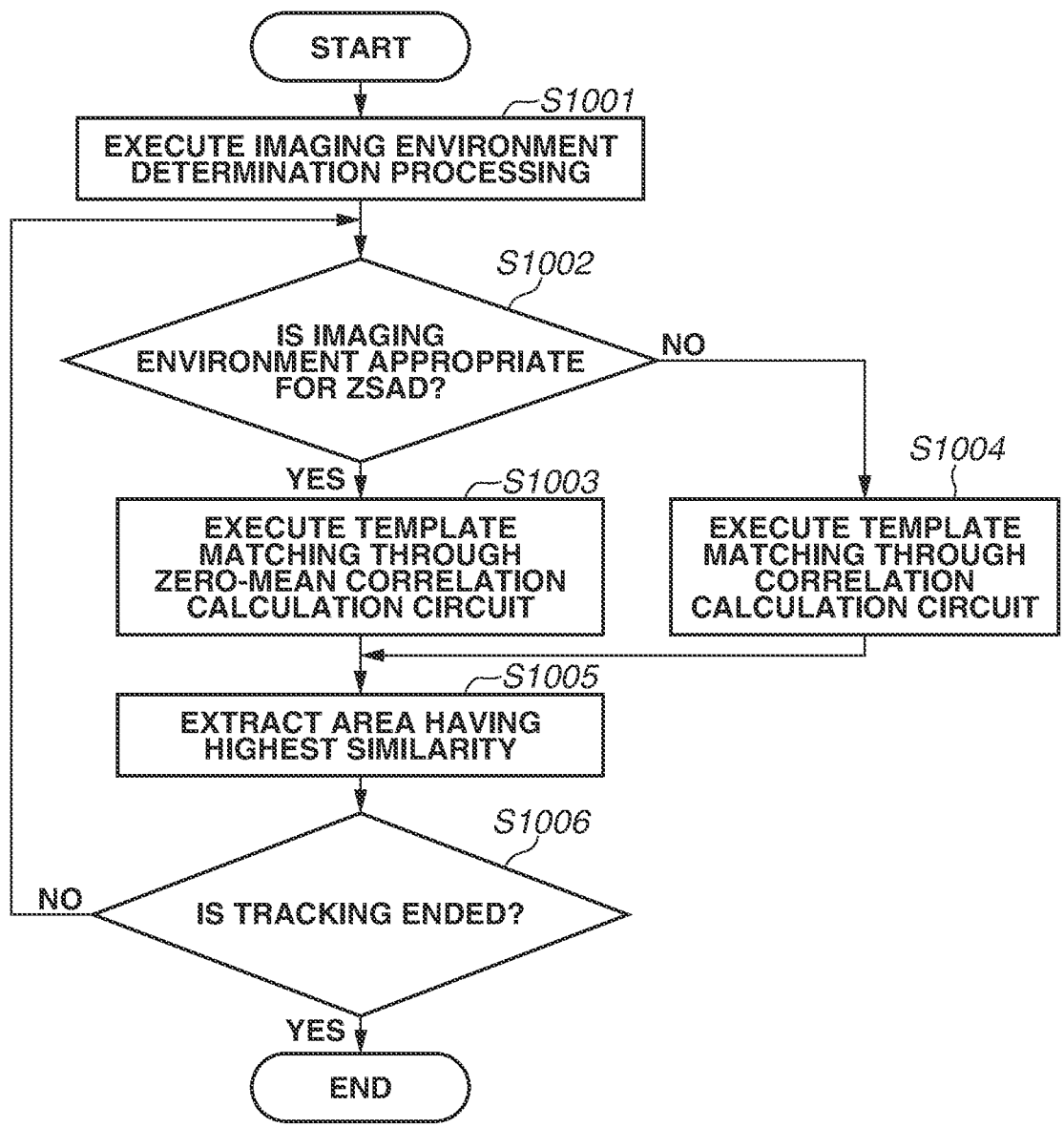
FIG. 10 is a flowchart illustrating object tracking processing according to the fourth exemplary embodiment of the present disclosure.

FIG. 10 is a flowchart illustrating the processing according to the present exemplary embodiment of the present disclosure. The processing steps illustrated in the flowchart are executed by the control circuit 106 or by the respective units of the image processing apparatus 101 based on the instructions issued by the control circuit 106.

In step S1001 of the flowchart in FIG. 10, an input image of a frame t=0 is read by the image processing apparatus 101, and an object area specified by the object specification unit 110 is registered in the template image registration circuit 902. In step S1001, the imaging condition decision circuit 901 determines whether there is any change of a setting of an exposure, an electronic flash, or a white balance caused by an instruction from the user.

If the set imaging condition has been changed, in step S1002, the tracking processing control circuit 905 determines that a luminance variation is affected by the change, and selects the ZSAD method. In contrast, if the imaging condition has not been changed, the tracking processing control circuit 905 determines that the luminance variation is small, and determines that the object is not appropriate for the ZSAD method.

If the object is determined to be the object appropriate for the ZSAD method in step S1002 (YES in step S1002), the processing proceeds to step S1003. In step S1003, the zero-mean correlation calculation circuit 904 reads an input image of a next frame t=1, and executes template matching processing of a partial area of the input image and a template image registered at the input image of the frame t=0 by using the ZSAD method.

If the object is determined to be the object inappropriate for the ZSAD method in step S1002 (NO in step S1002), the processing proceeds to step S1004. In step S1004, the correlation calculation circuit 903 reads an input image of a frame t=1, and executes template matching processing of a partial area of the input image and a template image registered at the input image of the frame t=0 by using the SAD method. After all of the areas of the input image are compared to the template image, the correlation calculation circuit 903 presumes that an area having the highest correlation is the object area in the frame t=1, and acquires a matching result.

In step S1005, the tracking processing control circuit 905 determines that an image corresponding to the area having the highest similarity in the input image is the object area, and extracts the image corresponding to the area. The tracking processing control circuit 905 outputs the extracted image to the template image registration circuit 902. The tracking processing control circuit 905 outputs the information about the determined object area to the control circuit 106 and the image processing circuit 107.

If the tracking processing is not ended in step S1006 (NO in step S1006), the processing returns to step S1002, so that the tracking processing control circuit 905 determines whether the object is appropriate for the ZSAD method, and executes the above-described processing flow again.

As described above, according to the present exemplary embodiment, the imaging condition decision circuit 901 determines whether the imaging condition is changed, and the tracking processing control circuit 905 selects whether template matching should be executed by using the SAD method or the ZSAD method based on the determination result, Thus, object tracking can be executed stably.

In the above-described exemplary embodiments, the image processing apparatus 101 is described as an example of an apparatus that executes object tracking.

The present disclosure is, however, applicable to various devices in addition to the image processing apparatus as described above. For example, in a case where the present disclosure is applied to an apparatus that reproduces and displays image data, a reproduction condition or a display condition of image data can be set by using information about an object area in the image data, such as a position and a size of the object in the image. Specifically, it is possible to control display conditions, such as a condition for superimposing the information indicating an object (e.g., a frame) at a position of the object in the image, and conditions for displaying (e.g., luminance and hue) for appropriately displaying an object portion based on the luminance and the color information of the object portion.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-053344, filed Mar. 26, 2021, which is hereby incorporated by reference herein in its entirety.

What is claimed is:

1. An image processing apparatus comprising:
at least one processor and a memory holding a program which makes the processor function as:
an analysis unit configured to analyze an image;
an extraction unit configured to extract a reference image corresponding to a specific object; and
a first correlation calculation unit and a second correlation calculation unit configured to estimate an area having a high correlation in an input image by using the reference image,
wherein the first correlation calculation unit is a correlation calculation unit configured to execute presumption based on components including a direct current (DC) component,
wherein the second correlation calculation unit is a correlation calculation unit configured to execute presumption based on an alternate current (AC) component, from which the DC component is eliminated,
wherein estimation of the area is performed by switching the first correlation calculation unit and the second correlation calculation unit based on at least any one of a detection result of the specific object, a feature amount of the specific object, and an analysis result of an imaging scene acquired by the analysis unit, and
wherein the first correlation calculation unit uses any one of a sum of absolute difference, a sum of squared difference, and a normalized correlation coefficient, and the second correlation calculation unit uses any one of a zero-mean sum of absolute difference, a zero-mean sum of squared difference, and a zero-mean normalized correlation coefficient.

2. The image processing apparatus according to claim 1, wherein the analysis unit uses an identifier trained through machine learning as a unit for detecting an object.

3. The image processing apparatus according to claim 1, wherein a unit for detecting a feature amount of an object used by the analysis unit extracts a high-frequency component of the image and calculates a feature amount from an acquired high-frequency component.

4. The image processing apparatus according to claim 1, wherein the analysis unit analyzes a scene by using information about luminance of the image.

5. The image processing apparatus according to claim 1, further comprising an image capturing unit configured to capture an object image formed through an optical system.

6. An image processing apparatus comprising:
at least one processor and a memory holding a program which makes the processor function as:
an imaging condition decision unit configured to decide an imaging condition;

an extraction unit configured to extract a reference image corresponding to a specific object; and a first correlation calculation unit and a second correlation calculation unit configured to estimate an area having a high correlation in an input image by using the reference image, wherein the first correlation calculation unit is a correlation calculation unit configured to execute presumption based on components including a DC component, wherein the second correlation calculation unit is a correlation calculation unit configured to execute presumption based on an AC component, from which the DC component is eliminated, wherein estimation of the area is performed by switching the first correlation calculation unit and the second correlation calculation unit based on the imaging condition decided by the imaging condition decision unit, and wherein the first correlation calculation unit uses any one of a sum of absolute difference, a sum of squared difference, and a normalized correlation coefficient, and the second correlation calculation unit uses any one of a zero-mean sum of absolute difference, a zero-mean sum of squared difference, and a zero-mean normalized correlation coefficient.

7. The image processing apparatus according to claim 6, wherein the imaging condition decision unit decides whether to change any one or more of imaging conditions of an electronic flash, an exposure, and a white balance.

8. The image processing apparatus according to claim 6, further comprising an image capturing unit configured to capture an object image formed through an optical system.

9. An image processing method comprising:

analyzing an image;

extracting a reference image corresponding to a specific object; and estimating an area having a high correlation in an input image by using the reference image, through a first correlation calculation unit and a second correlation calculation unit, wherein the first correlation calculation unit is a correlation calculation unit configured to execute presumption based on components including a DC component, wherein the second correlation calculation unit is a correlation calculation unit configured to execute presumption based on an AC component, from which the DC component is eliminated, wherein estimation of the area is performed by switching the first correlation calculation unit and the second correlation calculation unit based on at least any one of a detection result of the specific object, a feature amount of the specific object, and an analysis result of an imaging scene acquired by the analyzing, and wherein the first correlation calculation unit uses any one of a sum of absolute difference, a sum of squared difference, and a normalized correlation coefficient, and the second correlation calculation unit uses any one of a zero-mean sum of absolute difference, a zero-mean sum of squared difference, and a zero-mean normalized correlation coefficient.

10. A control method of an image processing apparatus including an image capturing unit, the control method comprising:

analyzing an image acquired from the image capturing unit;

extracting a reference image corresponding to a specific object; and estimating an area having a high correlation in an input image by using the reference image, through a first correlation calculation unit and a second correlation calculation unit, wherein the first correlation calculation unit is a correlation calculation unit configured to execute presumption based on components including a DC component, wherein the second correlation calculation unit is a correlation calculation unit configured to execute presumption based on an AC component, from which the DC component is eliminated, wherein estimation of the area is performed by switching the first correlation calculation unit and the second correlation calculation unit based on at least any one of a detection result of the specific object, a feature amount of the specific object, and an analysis result of an imaging scene, acquired by the analyzing, and wherein the first correlation calculation unit uses any one of a sum of absolute difference, a sum of squared difference, and a normalized correlation coefficient, and the second correlation calculation unit uses any of a zero-mean sum of absolute difference, a zero-mean sum of squared difference, and a zero-mean normalized correlation coefficient.

11. A control method of an image processing apparatus comprising:

deciding an imaging condition;

extracting a reference image corresponding to a specific object; and estimating an area having a high correlation in an input image by using the reference image, through a first correlation calculation unit and a second correlation calculation unit, wherein the first correlation calculation unit is a correlation calculation unit configured to execute presumption based on components including a DC component, wherein the second correlation calculation unit is a correlation calculation unit configured to execute presumption based on an AC component, from which the DC component is eliminated, wherein estimation of the area is performed by switching the first correlation calculation unit and the second correlation calculation unit based on the imaging condition, and wherein the first correlation calculation unit uses any one of a sum of absolute difference, a sum of squared difference, and a normalized correlation coefficient, and the second correlation calculation unit uses any one of a zero-mean sum of absolute difference, a zero-mean sum of squared difference, and a zero-mean normalized correlation coefficient.

12. A non-transitory computer-readable storage medium storing a program for causing a computer to execute respective pieces of processing of the control method according to claim 10.

13. A non-transitory computer-readable storage medium storing a program for causing a computer to execute respective pieces of processing of the control method according to claim 11.

* * * * *